United States Patent [19]
Nishioka

[11] Patent Number: 5,689,687
[45] Date of Patent: Nov. 18, 1997

[54] ELECTRONIC DEVICE

[75] Inventor: Yoko Nishioka, Yamatokoriyama, Japan

[73] Assignee: Sharp Kabushiki Kaisha, Osaka, Japan

[21] Appl. No.: 637,384

[22] Filed: Apr. 24, 1996

[30] Foreign Application Priority Data

Apr. 25, 1995 [JP] Japan ..................... 7-101138

[51] Int. Cl.⁶ ..................................... G06F 12/00
[52] U.S. Cl. .................. 395/514; 395/508; 345/201; 368/41; 368/28
[58] Field of Search .................. 395/514, 508, 395/501; 345/201, 185, 189, 87, 116; 368/28–30, 41, 73, 82

[56] References Cited

U.S. PATENT DOCUMENTS

| Re. 32,655 | 4/1988 | Levine | 345/189 |
|---|---|---|---|
| 4,542,480 | 9/1985 | Orii | 364/900 |
| 4,712,923 | 12/1987 | Martin | 368/41 |
| 5,530,684 | 6/1996 | Kataoka et al. | 368/41 |

FOREIGN PATENT DOCUMENTS

| 0342140 | 11/1989 | European Pat. Off. . |
|---|---|---|
| 0580116 | 1/1994 | European Pat. Off. . |
| 6-259894 | 3/1987 | Japan . |
| 6-5526 | 1/1994 | Japan . |

*Primary Examiner*—Kee M. Tung

[57] ABSTRACT

An electronic device includes a short-term data storing section for storing short-term data which represents a short-term scheduled event and includes graphic symbol data representing a graphic symbol and also for storing a first flag having one of a first state and a second state, the first flag corresponding to the short-term data; a long-term item data storing section for storing long-term data which represents a long-term scheduled event and includes long-term item data representing a long-term item of the long-term scheduled event and also for storing a second flag having one of the first state and the second state, the second flag corresponding to the long-term data; a display section for displaying the graphic symbol and the long-term item; a flag storing section for storing a third flag having one of the first state and the second state; and a control section. When the third flag is in the first state, the control section controls the display section to display the graphic symbol of the short-term scheduled event represented by the short-term data which corresponds to the first flag in the first state. When the third flag is in the second state, the control section controls the display section to display the long-term item of the long-term scheduled event represented by the long-term data which corresponds to the second flag in the first state.

7 Claims, 12 Drawing Sheets

| Starting date ↓ 20 | Terminating date ↓ 21 | Long-term item ↓ 22 | Flag ↓ 23 |
|---|---|---|---|
| 1995.4.20 | 1995.4.21 | Conference | |
| 1995.4.29 | 1995.4.30 | Business trip | |
| 1995.5.5 | 1995.5.6 | Private trip | |
| 1995.5.15 | 1995.5.19 | Trade show | ✳ |
| 1995.5.30 | 1995.5.31 | Business trip | |
| ⋮ | ⋮ | ⋮ | |

(3a) → 1995.5.5 row
(3b) → 1995.5.15 row

FIG. 4

| Date ↓ 30 | Graphic symbol code ↓ 31 | Flag ↓ 32 |
|---|---|---|
| 1995.4.10 | 7e51h | |
| 1995.5.7 | 7e20h | |
| 1995.5.12 | 7e35h | |
| 1995.5.15 | 7f3ah | ✳ |
| 1995.5.25 | 7fafh | |
| 1995.5.28 | 7e50h | |
| ⋮ | ⋮ | |

(4a) → 1995.5.7 row
(4b) → 1995.5.15 row

FIG.5

| 7e20h |  |
| ⋮ | |
| 7e35h |  |
| ⋮ | |
| 7e50h |  |
| 7e51h |  |
| ⋮ | |
| 7f3ah |  |
| ⋮ | |
| 7fafh |  |
| ⋮ | |

ELECTRONIC DEVICE

BACKGROUND OF THE INVENTION

1. Field of the Invention

The present invention relates to an electronic device such as an electronic diary or a portable data processing terminal.

2. Description of the Related Art

Conventional electronic devices have a calendar function for displaying a calendar of an arbitrary month and/or a schedule function for storing a schedule. An electronic device having both the calendar function and the schedule function displays a calendar of an arbitrary month together with the schedule of the month.

In an electronic diary or a portable data processing terminal, which has a limited area for data display, it is difficult to display a plurality of items scheduled on a single day.

SUMMARY OF THE INVENTION

An electronic device according to the present invention includes: a short-term data storing section for storing short-term data which represents a short-term scheduled event and includes graphic symbol data representing a graphic symbol and also for storing a first flag having one of a first state and a second state, the first flag corresponding to the short-term data; a long-term item data storing section for storing long-term data which represents a long-term scheduled event and includes long-term item data representing a long-term item of the long-term scheduled event and also for storing a second flag having one of the first state and the second state, the second flag corresponding to the long-term data; a display section for displaying the graphic symbol and the long-term item; a flag storing section for storing a third flag having one of the first state and the second state; and a control section for, when the third flag is in the first state, controlling the display section to display the graphic symbol of the short-term scheduled event represented by the short-term data which corresponds to the first flag in the first state and for, when the third flag is in the second state, controlling the display section to display the long-term item of the long-term scheduled event represented by the long-term data which corresponds to the second flag in the first state.

In one embodiment of the invention, when the third flag is in the first state, the control section controls the display section to delete the long-term item of the long-term scheduled event represented by the long-term data which corresponds to the second flag in the first state. When the third flag is in the second state, the control section controls the display section to display the graphic symbol of the short-term scheduled event represented by the short-term data which corresponds to the first flag in the first state.

In another embodiment of the invention, the short-term data further includes date data representing a date on which the short-term item is scheduled, and the long-term data further includes period data representing a starting date and a terminating date of a period during which the long-term item is scheduled. When the date represented by the date data is included in the period represented by the period data, the control section puts the first flag corresponding to the short-term data into the first state and puts the second flag corresponding to the long-term data into the first state.

In still another embodiment of the invention, the electronic device further includes an input section for inputting the short-term data and the long-term data.

In still another embodiment of the invention, the display section is a liquid crystal display device.

In still another embodiment of the invention, the short-term data storing section is a RAM.

In still another embodiment of the invention, the long-term data storing section is a RAM.

For displaying a schedule, an electronic device according to the present invention first determines whether or not a plurality of items are scheduled on any single day. If a plurality of items are scheduled on a single day, such items are displayed alternately by a prescribed period of time. Accordingly, a plurality of items scheduled on the single day can be displayed in a limited area of the screen. The user can check all the items scheduled in a particular month without any additional operation.

Thus, the invention described herein makes possible the advantage of providing an electronic device which can display a plurality of items scheduled for the same day in a switching manner.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
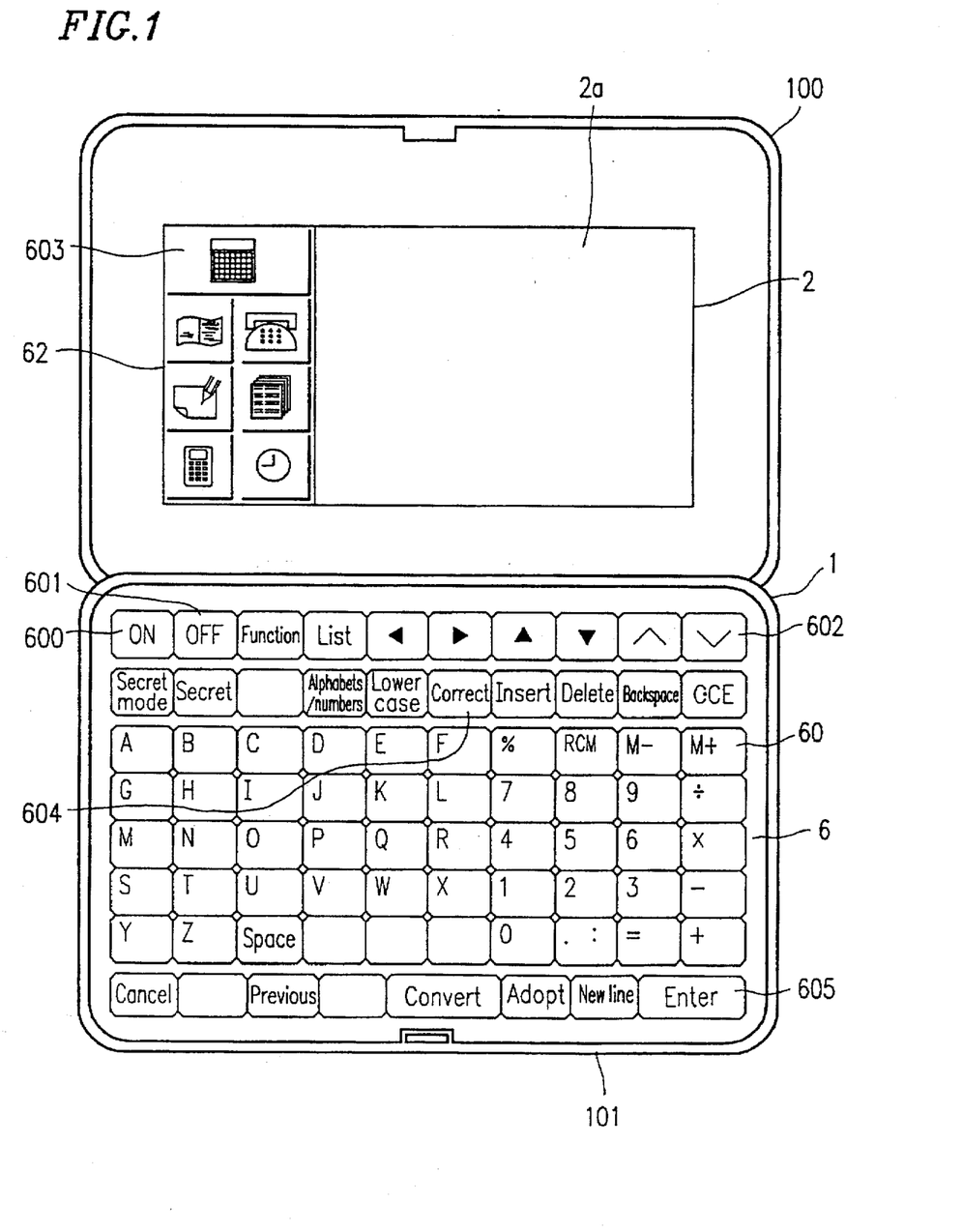
FIG. 1 is a plan view of an electronic device in an example according to the present invention in the state of being open.

FIG. 1 is a plan view of an electronic device 1 in an example according to the present invention in the state of being open. As is shown in FIG. 1, the electronic device 1 includes a display section 2 for displaying data, messages, operation results and the like, and an input key group 6, and a mode setting key group 62. The mode setting key group 62 includes a calendar mode key 603. The display section 2 can display characters and graphics on a screen 2a thereof. A transparent tablet (not shown) for detecting a character, line, dot or the like which has been input with a pen can be provided on the screen 2a.

Figure 2:
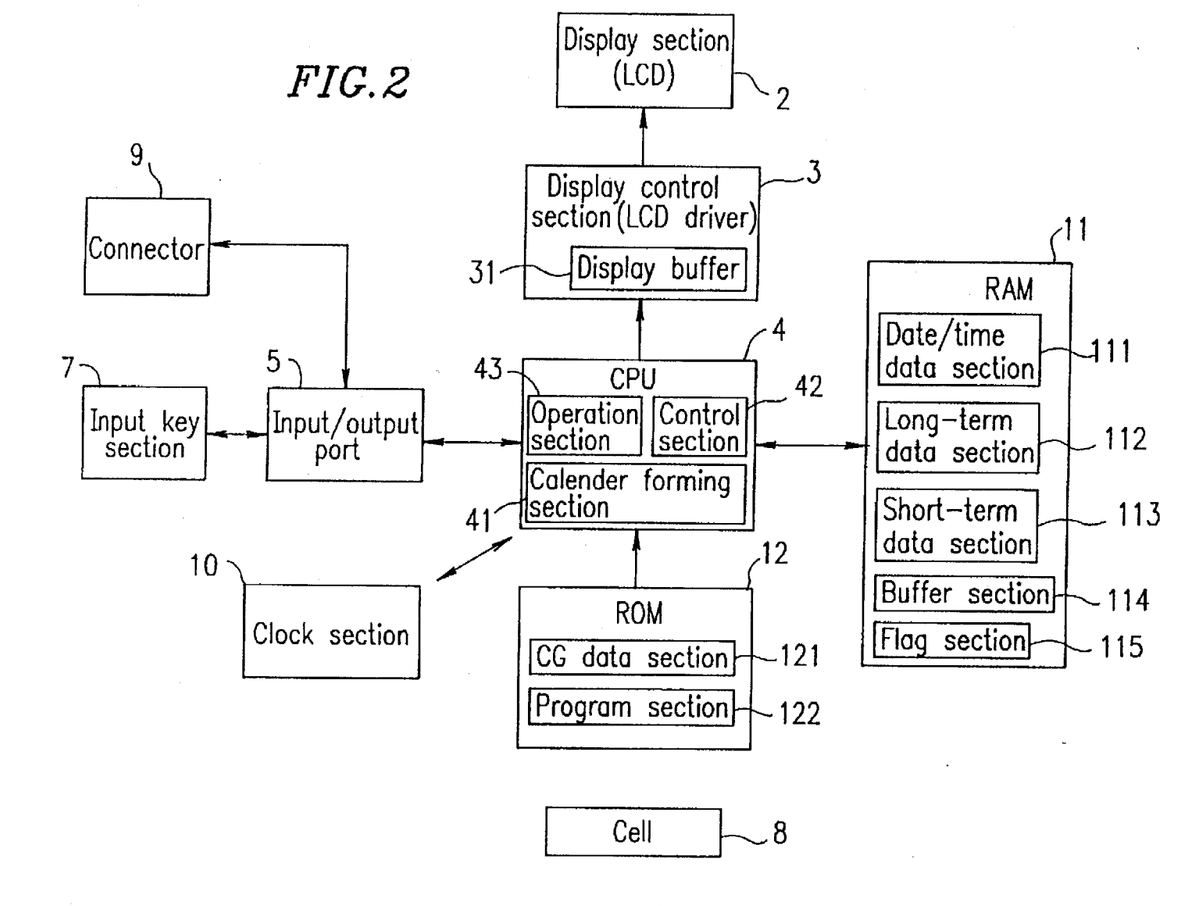
FIG. 2 is a block diagram of the electronic device shown in FIG. 1.

The input key group 6 includes a data input key group 60 for inputting letters, numerical figures and the like, a power ON key 600 for turning on the electronic device 1, a power OFF key 601 for turning off the electronic device 1, and a scroll-down key 602 used for, for example, searching for and retrieving schedule information used in a schedule mode, address information used in an address book mode, memo information used in a memo mode, or other data stored in the electronic device 1. The input key group 6 further includes a correction key 604 for correcting the data retrieved using the scroll-down key 602, and an enter key 605 for storing the input or corrected data in a RAM 11 (FIG. 2). The mode setting key group 62 is used for setting the electronic device 1 to, for example, the calendar mode, the schedule mode, the address book mode, the memo mode, a calculation mode, or a clock mode.

The electronic device 1 has an upper casing 100 and a lower casing 101. The display section 2 and the mode setting key group 62 may be located in the upper casing 100. The input key group 6 may be located in the lower casing 101.

FIG. 2 is a block diagram of the electronic device 1. As is shown in FIG. 2, the electronic device 1 includes the display section 2 (for example, a dot-matrix type LCD), a display control section 3 (for example, an LCD driver), a CPU 4, an input/output port 5, an input key section 7, a cell 8, a clock section 10, the RAM 11, and a ROM 12.

The CPU 4 includes a control section 42 for controlling data input and output, an operation section 43 for operating the data, and a calendar forming section 41 for forming a calendar to be displayed on the screen 2a of the display section 2. The calendar displayed on the screen 2a includes a plurality of date areas and a plurality of memo areas respectively corresponding to the plurality of dates. FIGS. 10 through 13 show different examples of the calendar which can be displayed on the screen 2a.

The control section 42 of the CPU 4 controls the display section 2 by a control signal to display characters and graphics on the screen 2a in the following manner.

The control section 42 of the CPU 4 outputs data to be displayed on the screen 2a representing, for example, an operation result or a message, and a control signal to the display control section 3. Based on the control signal from the control section 42, the data to be displayed is stored in a display buffer 31 of the display control section 3. The operation result or the message indicated by the data stored in the display buffer 31 is displayed on the screen 2a.

As is mentioned above, the input key section 7 includes the input key group 6 and the mode setting key group 62. The data which is input using the input key section 7 is sent to the CPU 4 via the input/output port 5. Upon receipt of the data, the CPU 4 determines which keys in the input key section 7 have been pressed.

The clock section 10 generates time data representing the present time (second, minute, hour, day, month, year, etc.).

The RAM 11 for storing the data input to the electronic device 1 includes a date/time data section 111, a long-term data section 112, a short-term data section 113, a buffer section 114 and a flag section 115. In this specification, a long-term item is scheduled for at least two consecutive days (long-term period). A short-term item is done within one day and is represented by a graphic symbol.

The date/time data section 111 stores the time data generated by the clock section 10.

The long-term data section 112 stores long-term data and a flag corresponding to the such data. The long-term data includes: long-term item data which represents a long-term item scheduled for a long-term period, starting date data which represents the starting date on which the long-term item begins, and the terminating date data which represents the terminating date on which the long-term item finishes. In this example, the starting date and the terminating date are represented in the form of year/month/day, although month/day/year or other combinations may be used. The long-term item and the corresponding starting date and terminating date are referred together as a long-term scheduled event. The corresponding starting date data and terminating date data are referred together as period data.

The short-term data section 113 stores short-term data and a flag corresponding to such data. The short-term data includes: a graphic symbol code corresponding to a graphic symbol indicating a short-term item scheduled on a date, and date data which represents the date on which the short-term item is scheduled. The graphic symbol code corresponding to the short-term item and the date on which the short-term item is scheduled are referred together as a short-term scheduled event.

As is described later in detail, when the date for a short-term item represented by the graphic symbol is included in the long-term period for a long-term item between the starting date and the terminating date, a flag is set corresponding to such long-term data, and a flag is set corresponding to such short-term data. Otherwise, no flag is set for any of such data.

The buffer section 114 temporarily stores the data stored in the date/time data section 111, the long-term data section 112, or the short-term data section 113 when correcting such data or performing other operations.

In the flag section 115, a flag is set to indicate which of the long-term item or the short-term item is displayed on the screen 2a.

Since the RAM 11 is constantly supplied with power from the cell 8, the data stored in the RAM 11 is retained even after the power OFF key 601 is pressed.

The ROM 12 includes a program section 122 for storing programs required to operate the CPU 4 and a CG data section 121 for storing character fonts required to display characters on the screen 2a.

The electronic device 1 may include a connector 9 for data input/output with an external device. The connector 9 is connected to the input/output port 5.

Figure 3:
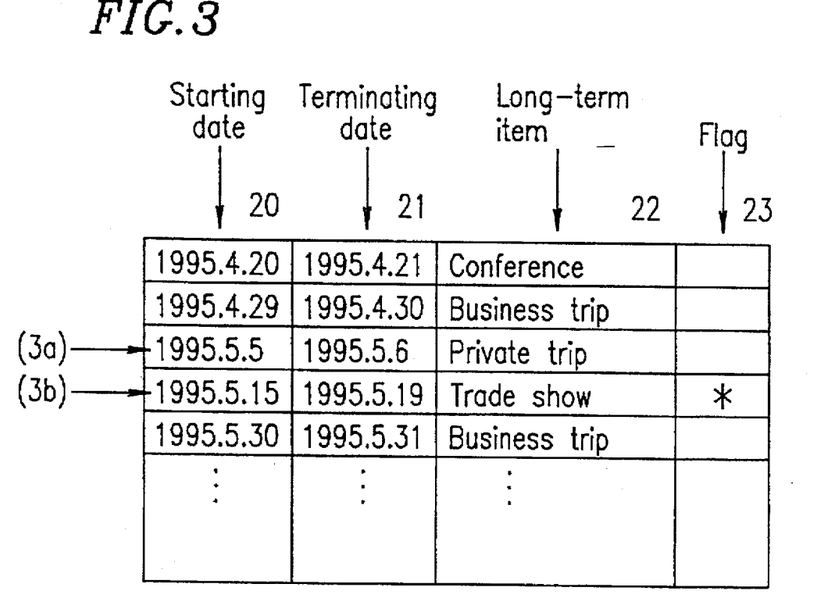
FIG. 3 is an example of long-term data stored in the RAM.
Figure 4:
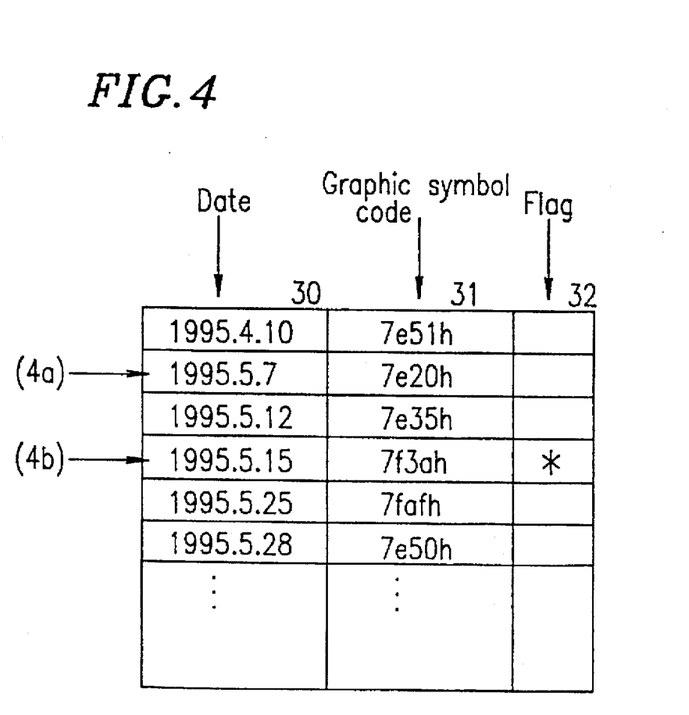
FIG. 4 is example of short-term data stored in the RAM.

FIG. 3 shows an example of long-term data and the state of the flag which are stored in the long-term data section 112. FIG. 4 shows an example of short-term data and the state of the flag which are stored in the short-term data section 113.

As is shown in FIG. 3, the long-term data section 112 includes a plurality of rows and columns 20 through 23. The columns 20 through 23 of each row store the following. The column 20 stores starting date data which represents the starting date of the long-term period of the corresponding long-term data; the column 21 stores terminating date data which represents the terminating date of the long-term period; the column 22 stores the long-term item scheduled during the long-term period; and the column 23 stores the flag when the long-term period includes any date on which a short-term item is scheduled (see FIG. 4). When the long-term period does not include any such date, no flag is stored. In FIG. 3, the symbol "*" indicates that a flag is stored.

For example, the following are stored in row 3a: "1995.5.5" (May 5, 1995) as the starting date, "1995.5.6" (May 6, 1995) as the terminating date, and "private trip" as the long-term item. Since the period from May 5, 1995 through May 6, 1995 does not include any day on which a short-term item represented by a graphic symbol is scheduled, no flag is set. In row 3b, since the period from May 15, 1995 through May 19, 1995 includes a day on which a short-term item represented by a graphic symbol is scheduled, a flag is set.

As is shown in FIG. 4, the short-term data section 113 includes a plurality of rows and columns 30 through 32. The columns 30 through 32 of each row store the following. The column 30 stores date data which represents the date on which the short-term item is scheduled; the column 31 stores the graphic symbol code corresponding to the graphic symbol which indicates the short-term item; and the column 32 stores the flag when the date is included in any long-term period during which a long-term item is scheduled (see FIG. 3). When the date is not included in any such period, no flag is stored. In FIG. 4, symbol "*" indicates that a flag is stored. The graphic symbol code, which will be described later in detail, may be a JIS code or any other type of codes.

For example, the following are stored in row 4a: "1995.5.7" (May 7, 1995) as the date and "7e20h" as the graphic symbol code. In this specification, the numerical figure preceding letter "h" is a hexadecimal number. Letter "h" may also be a heptadecimal or octademical number. Since the date May 7, 1995 is not included in any long-term period during which a long-term item is scheduled, no flag is set. In row 4b, since the date May 15, 1995 is included in a long-term period during which a long-term item (trade show in row 3b) is scheduled, a flag is set.

Figure 5:
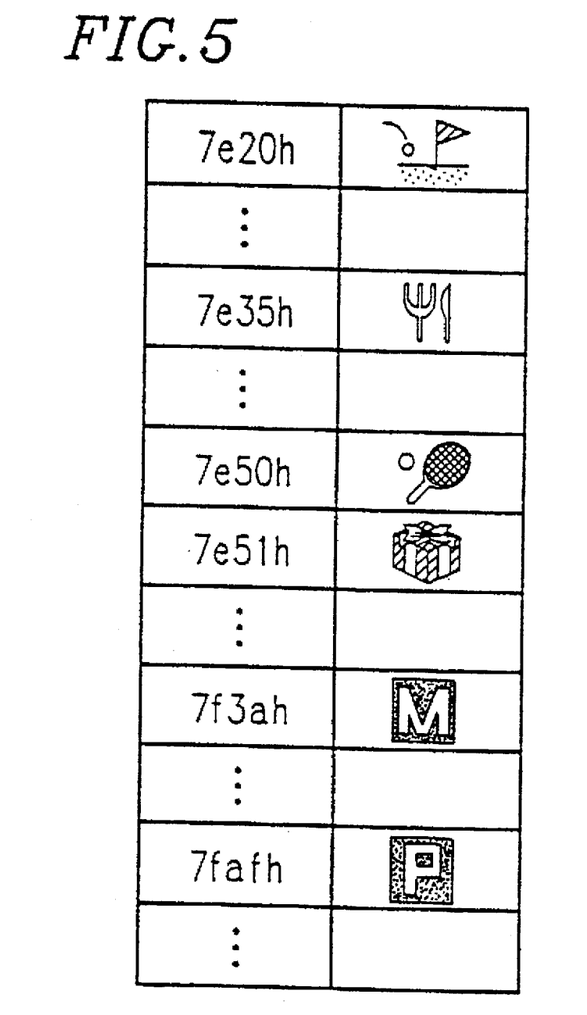
FIG. 5 is an example of the correspondence between a graphic symbol and a graphic symbol code.

FIG. 5 shows an example of the correspondence between graphic symbols and graphic symbol codes. For example, code "7e20h" corresponds to a graphic symbol indicating playing golf; and code "7e35" corresponds to a graphic symbol indicating taking a meal. Code "7f3ah" corresponds to a graphic symbol indicating a meeting; and code "7fafh" corresponds to a graphic symbol indicating a payday.

Figure 6:
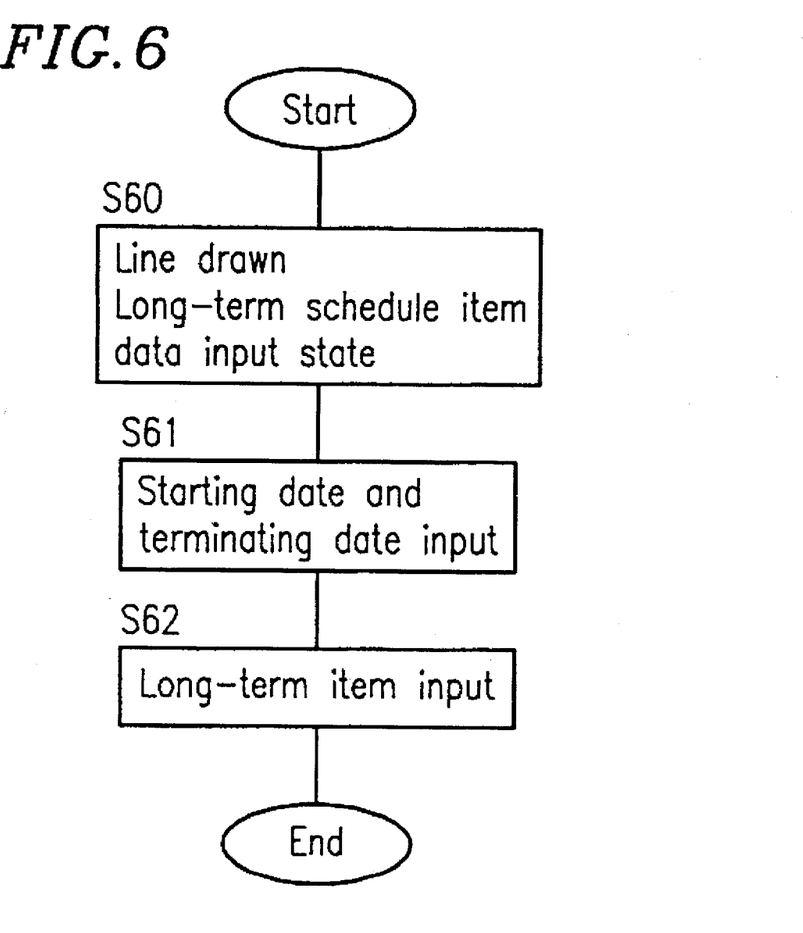
FIG. 6 is a flowchart illustrating a process for inputting long-term data.

FIG. 6 is a flowchart showing a process for inputting long-term data to the electronic device 1.

In step S60, a line is drawn with a pen over a plurality of date areas on the calendar displayed on the screen 2a of the display section 2, whereby the electronic device 1 is put into the state of receiving long-term data. Such a state can also be realized when the areas in the calendar corresponding to a plurality of dates are touched with a pen within a predetermined period of time.

In step S61, the starting date and the terminating date of the long-term period for the long-term item are input using the data input key group 60.

The long-term period for the long-term item may be input by drawing a line over a plurality of date areas on the calendar corresponding to the long-term period in step S60. In such a case, an input error can be corrected in step S61.

In step S62, the long-term item scheduled for the long-term period is input using the data input key group 60.

By repeating steps S60 through S62, the long-term data as shown in FIG. 3 is input to the electronic device 1 and stored in the long-term data section 112.

Figure 7:
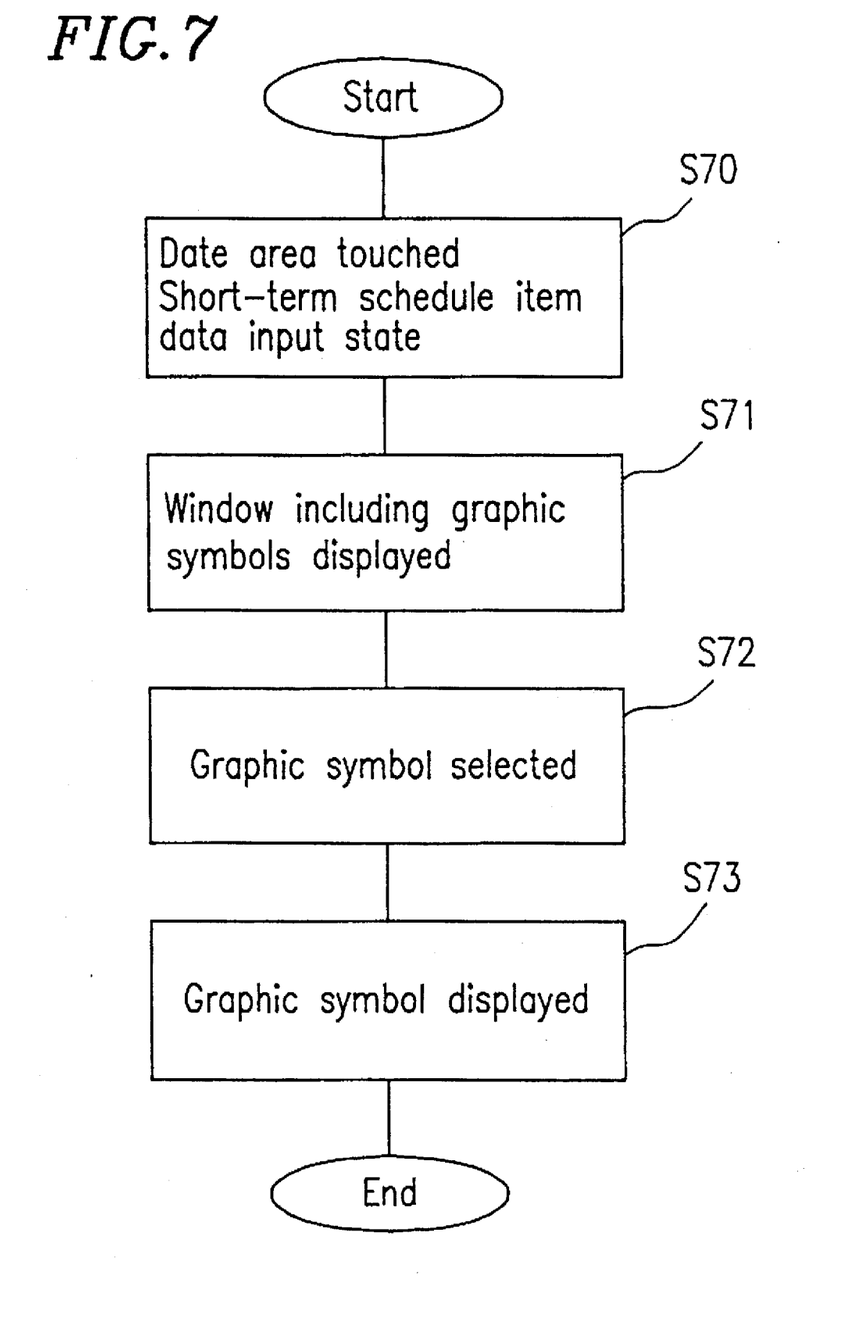
FIG. 7 is a flowchart illustrating a process for inputting short-term data.

FIG. 7 is a flowchart showing a process for inputting short-term data to the electronic device 1.

In step S70, a memo area on the screen 2a corresponding to the date on which a short-term item is scheduled is touched with a pen, whereby the electronic device 1 is put into the state of receiving short-term data. Simultaneously, such a date is input to the electronic device 1 as the date for the short-term item. In step S71, a window including a plurality of graphic symbols is displayed on the screen 2a.

In step S72, an arbitrary graphic symbol is touched with a pen to be selected. Then, in step S73, the selected graphic symbol is displayed in the memo area corresponding to the date for the short-term item.

By repeating steps S70 through S73, the short-term data as shown in FIG. 4 is input to the electronic device 1 and stored in the short-term data section 113.

Figure 8:
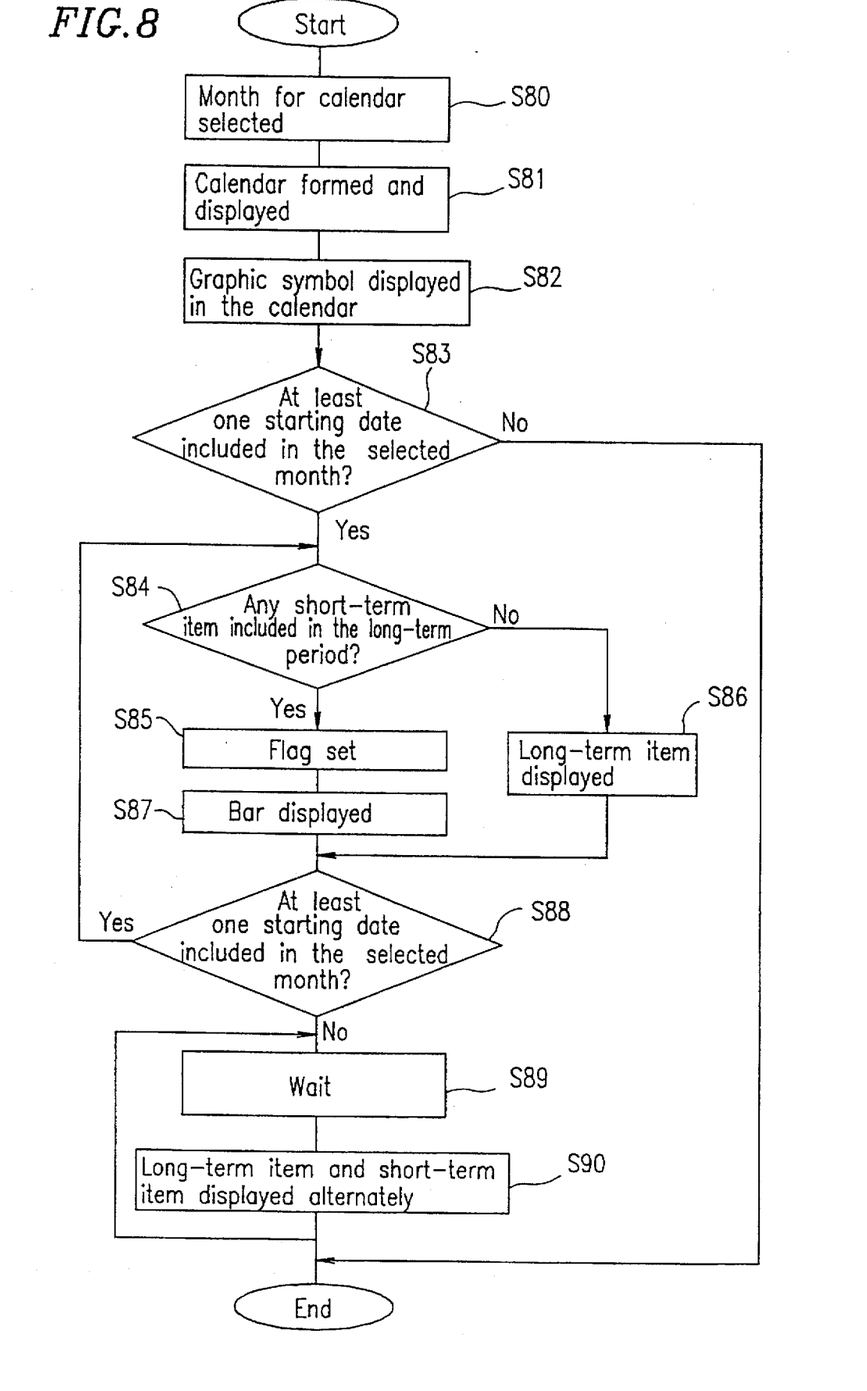
FIGS. 8 and 9 are flowcharts illustrating a process for displaying a plurality of items scheduled on a single day alternately.
Figure 9:
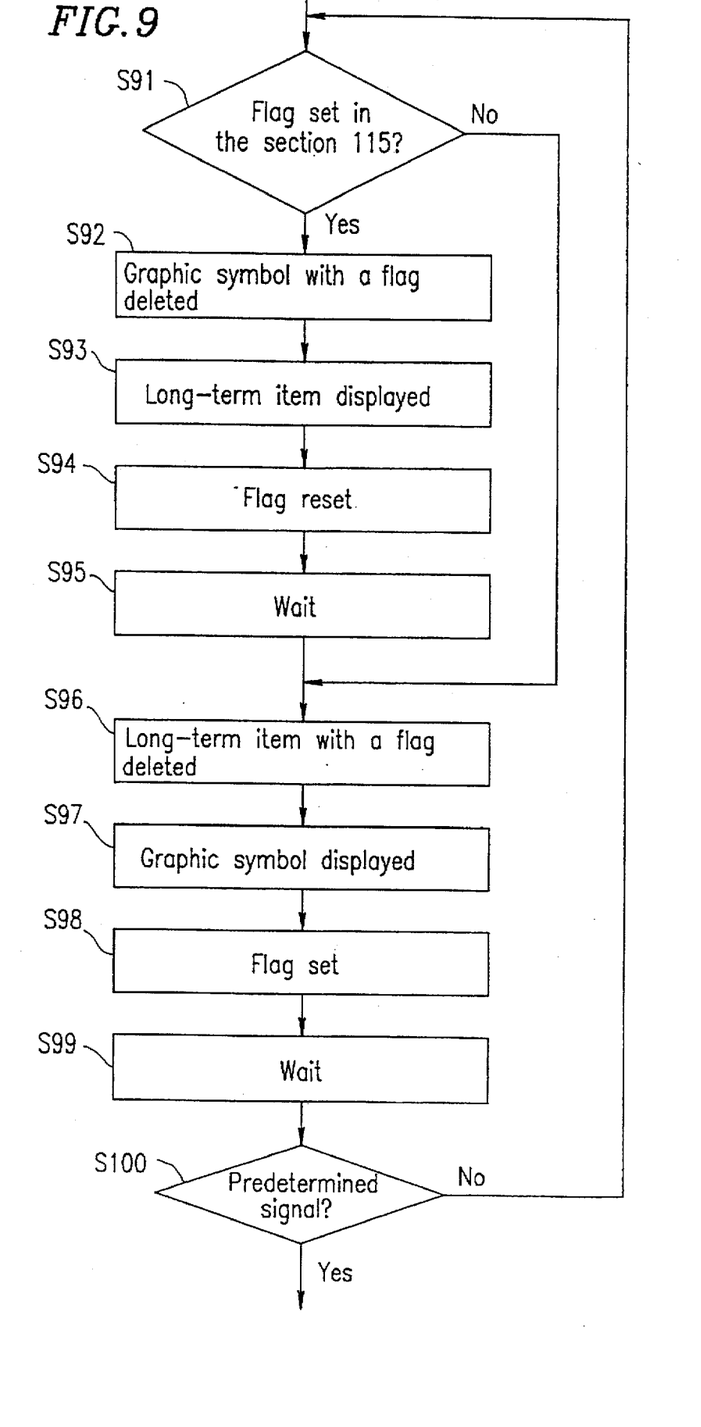

FIGS. 8 and 9 illustrate a process for displaying a long-term item and a short-term item alternately.

First, the user presses the power ON key 600 to turn on the electronic device 1, and then presses the calendar mode key 603 to put the electronic device 1 into the calendar mode (not shown in FIG. 8).

In step S80, a certain month of a certain year is input using the data input key group 60 to select the month. In step S81, the calendar forming section 41 in the CPU 4 forms calendar data corresponding to the selected month and sends the calendar data to the display buffer 31 of the display control section 3. The display control section 3 controls the display section 2 to display a calendar of the selected month represented by the calendar data.

If any month of any year is not input in step S80, the calendar forming section 41 retrieves time data stored in the date/time data section 111, and thus the calendar of the current month is displayed on the screen 2a.

In step S82, the graphic symbols indicating the short-term items scheduled in the selected month in the calendar on the screen 2a are displayed by the CPU 4. In detail, the following are performed by the CPU 4. First, one of the date data and the corresponding graphic symbol code are retrieved from the columns 30 and 31 in the short-term data section 113 (for example, FIG. 4). Then, whether or not the date represented by the date data is included in the selected month is determined. If the date is included in the selected month, the graphic symbol indicating the short-term item scheduled on that date is displayed in the memo area corresponding to the date, based on the date data and the graphic symbol code retrieved from the short-term data section 113. The CPU 4 stores "1" in the flag section 115 of the RAM 11 for initialization.

If the date is not included in the selected month, the graphic symbol corresponding to that date is not displayed, and the CPU 4 stores "0" in the flag section 115 of the RAM 11 for initialization. Such operation is repeated for all the short-term data stored in the short-term data section 113. Thus, the operation goes to step S83.

Numerical figures "1" and "0" are binary codes which indicate if a flag is set or not and can be replaced with any codes which can be used as binary codes. Code "1" means a flag is set, and code "0" means no flag is set.

In step S83, the CPU 4 determines whether or not the starting dates represented by the starting date data stored in the long-term data section 112 (FIG. 3) include at least one starting date which is included in the selected month. If at least one such starting date is included, the operation goes to step S84, and if there is no such starting date, the operation is terminated.

In step S84, it is determined whether or not the long-term period starting on the starting date which has been determined to be included in the selected month in step S83 includes any of the dates of the selected month on which a short-term item is scheduled. If the long-term period includes any such date, the operation goes to step S85. If no such date is included, the operation goes to step S86.

In step S85, a flag is set corresponding to the short-term item scheduled on the date included in the long-term period, and a flag is also set corresponding to the long-term item scheduled in the period including the date on which the short-term item is scheduled. In other words, "1" is stored in the column 23 in the long-term data section 112 (for example, FIG. 3) and also in the column 32 in the short-term data section 113 (for example, FIG. 4) in correspondence with such items. Then, the operation goes to step S87.

In step S87, a bar may be displayed in the memo areas corresponding to the dates of the long-term period in order to show that such a long-term period during which a long-term item is scheduled includes a date on which a short-term item is scheduled. The bar may be displayed above or below the graphic symbol to avoid overlapping the graphic symbol. Then, the operation goes to step S88.

In step S86, the long-term item scheduled during the long-term period is displayed in the memo areas of the corresponding dates by the CPU 4, based on the long-term data (the long-term item and the corresponding starting date data and terminating date data). Then, the operation goes to step S88.

In step S88, the CPU 4 determines whether or not the remaining starting dates stored in the long-term data section 112 include at least one starting date which is included in the selected month. If at least one such starting date is included, the operation goes back to step S84, and the operation in steps S84 through S88 is repeated. If there is no such starting date in step S88, the operation goes to step S89.

In this manner, the following are displayed on the calendar: the graphic symbols indicating all the short-term items scheduled in the selected month, and all the long-term items scheduled during the long-term periods which start in the selected month and do not include any date for a short-term item. Moreover, all the long-term items scheduled during the long-term periods which start in the selected month and include any date for a short-term item are each indicated by a bar. In step S89, the operation waits for a prescribed period of time and goes to step S90.

In step S90, which includes steps S91 through S100 shown in FIG. 9, (a) the graphic symbols indicating the short-term items scheduled on the dates included in the long-term period during which the long-term item is scheduled and (b) the long-term items scheduled in the long-term periods including the dates on which the short-term items are scheduled are displayed alternately.

In step S91, the CPU 4 determines whether or not a flag is set in the flag section 115 in the RAM 11 for any one of the short-term items by checking the value of the flag section 115. If the value is "1", namely, if a flag is set, the operation goes to step S92. If the value is "0", namely, if no flag is set, the operation goes to step S96.

In step S92, the CPU 4 retrieves any short-term data stored with a flag in the short-term data section 113, and controls the display section 2 to delete the graphic symbol indicating the corresponding short-term item from the calendar. Then, the operation goes to step S93.

In step S93, the CPU 4 retrieves any long-term data stored with a flag in the long-term data section 112, and the display section 2 displays the corresponding long-term item in the memo areas in the calendar corresponding to the long-term period during which the long-term item is scheduled, based on the long-term data. The bar is kept displayed.

In step S94, the flag is reset in the flag section 115.

In this manner, the following are displayed on the screen 2a: all the long-term items scheduled in the long-term period which starts in the selected month, and the graphic symbols indicating all the short-term items scheduled on the dates which are in the selected month and are not included in any long-term period during which a long-term item is scheduled. The bar is still displayed. In step S95, the CPU 4 waits for a prescribed period of time.

In step S96, the CPU 4 retrieves any long-term data stored with a flag in the long-term data section 112, and controls the display section 2 to delete the corresponding long-term item from the calendar. Then, the operation goes to step S97.

In step S97, the CPU 4 retrieves any short-term data stored with a flag in the short-term data section 113, and the display section 2 displays the corresponding short-term item, based on the short-term data. In other words, the graphic symbol indicating the corresponding short-term item is displayed in the corresponding memo area of the calendar. The bar is kept displayed.

In step S98, a flag is set in the flag section 115.

In this manner, the following are displayed: the graphic symbols indicating all the short-term items which are scheduled in the selected month, and all the long-term items scheduled during the long-term period which start in the selected month and do not include any date on which a short-term item is scheduled. The bar is still displayed. In step S99, the CPU 4 waits for a prescribed period of time.

In step S100, if a predetermined signal is input using the input key section 7, the operation is terminated. If such a signal is not input, the operation goes back to step S91.

Alternatively, bars may be displayed for all the long-term items scheduled in the selected month in order to show the periods for such long-term items, whether or not such periods include any date on which a short-term item is scheduled.

Hereinafter, an example of the operation of the electronic device 1 will be described.

Figure 10:
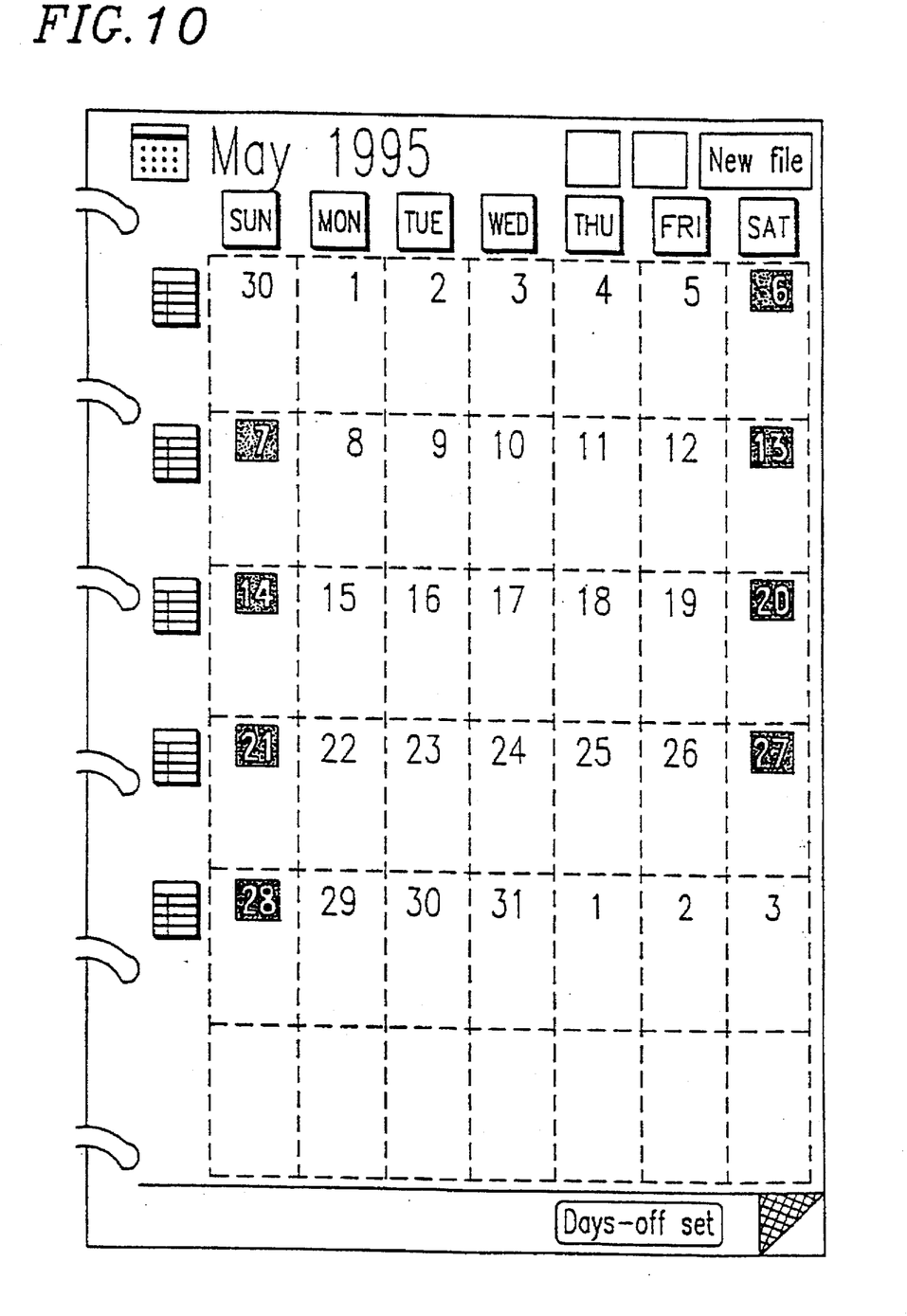
FIGS. 10 through 13 are views illustrating exemplary calendars displayed in the electronic device shown in FIG. 1.

When the user inputs May 1995 using the input key section 7, the calendar forming section 41 in the CPU 4 forms a calendar of May 1995 as is shown in FIG. 10, which is displayed on the screen 2a.

The CPU 4 searches for the leading end of the data corresponding to May 1995 in the short-term data section 113.

With reference to FIG. 4, for example, the short-term data in row 4a for May 7, 1995 is at the leading end. A graphic symbol indicated by the graphic symbol code "7e20h" is displayed in the memo area corresponding to May 7, 1995. As is mentioned above, the correspondence between the graphic symbol and the graphic symbol code is illustrated in FIG. 5.

Figure 11:
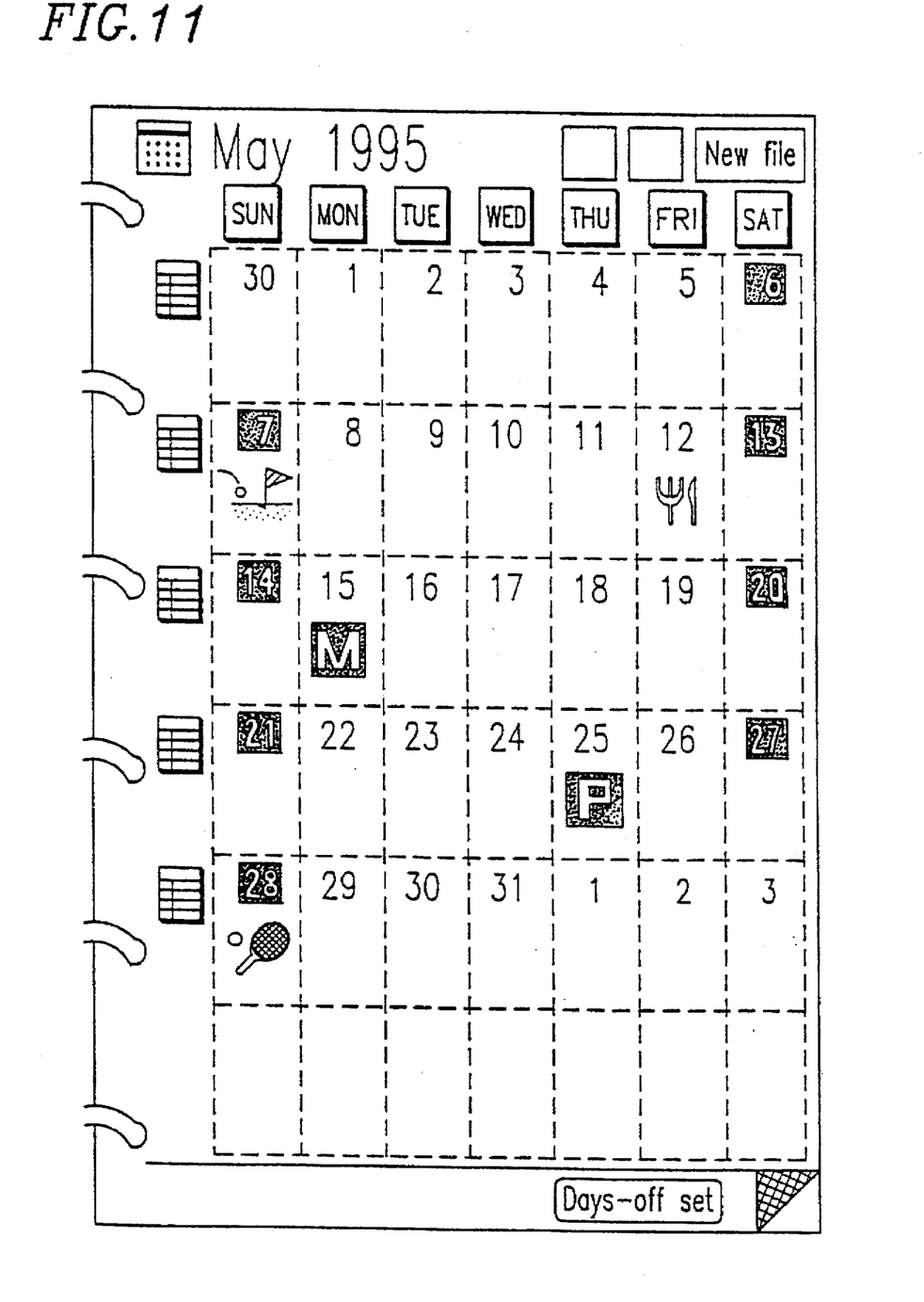
Figure 12:
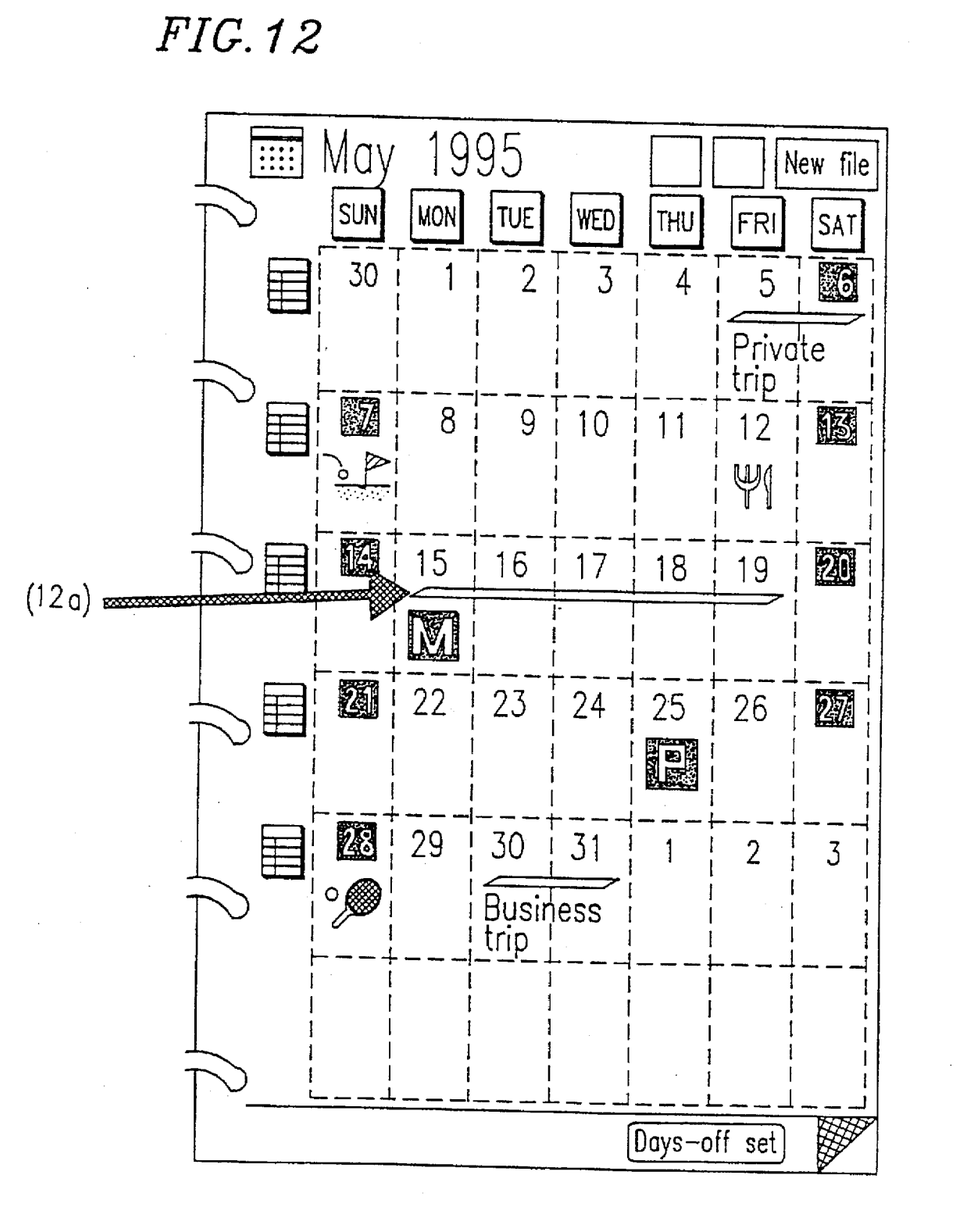
Figure 13:
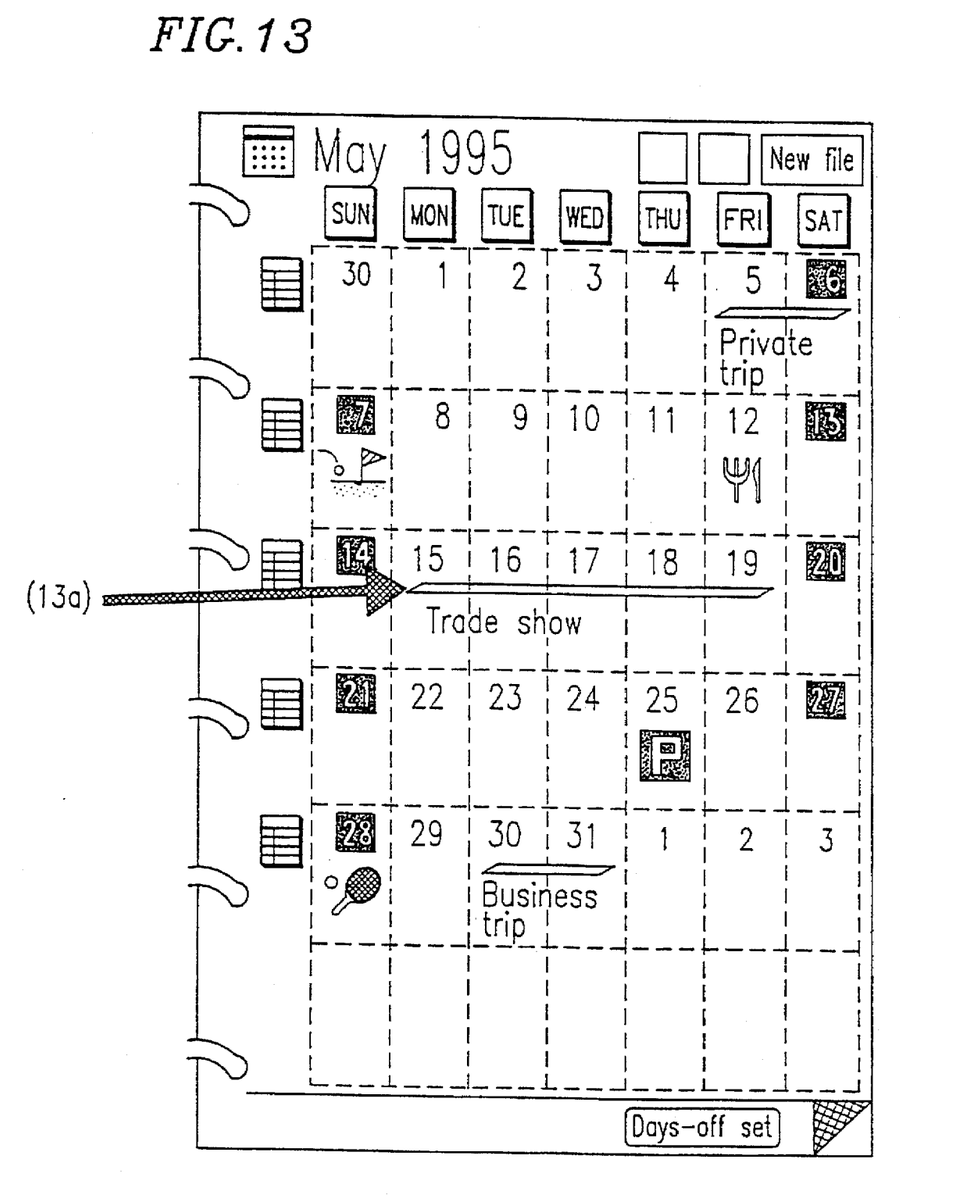

The next short-term data in terms of time is in row 4b for May 15, 1995. The graphic symbol corresponding to the graphic symbol code "7f3ah" is displayed in the memo area for May 15, 1995. In this manner, all the short-term items scheduled in May 1995 are displayed by the graphic symbols as is shown in FIG. 11.

The CPU 4 searches for the leading end of the data corresponding to May 1995 in the long-term data section 112.

With reference to FIG. 3, for example, the long-term data in row 3a starting on May 5, 1995 is at the leading end. The CPU 4 determines whether or not any short-term item is scheduled during the long-term period from May 5, 1995 through May 6, 1995, during which a private trip is scheduled. The CPU 4 determines that no short-term item is scheduled during such a period. Thus, the long-term item "private trip" is displayed in the memo areas corresponding to such a period.

The next long-term data in terms of time is in row 3b and starts on May 15, 1995. The CPU 4 determines whether or not any short-term item is scheduled during the long-term period from May 15, 1995 through May 19, 1995, during which a trade show is scheduled. The CPU 4 determines that May 15, 1995 on which a meeting is scheduled is included in such a period. Thus, as is indicated by 12a of FIG. 12, a bar is displayed in the memo areas corresponding to the period from May 15, 1995 through May 19, 1995, to indicate there is a long-term item scheduled during such a period, without displaying "trade show".

Flags are set for row 3b in FIG. 3 and row 4b in FIG. 4 by the CPU 4. All the long-term items scheduled in May 1995 are processed in this manner.

The CPU 4 sets a flag in the flag section 115 of the RAM 11 to indicate that the graphic symbol of the short-term item is displayed for the date which is included in the period for which a bar is also displayed. This means that, in the case where the date for the short-term item is included in the period for the long-term item, the graphic symbol indicating the short-term item is displayed. Then, the CPU 4 waits for a prescribed period of time.

Next, the CPU 4 switches the graphic symbol displayed together with the bar to the long-term item.

For example, any short-term item scheduled in May 1995 and stored with a flag is searched for in the short-term data section 113. The graphic symbol indicating such a short-term item is deleted from the calendar, referring to the short-term data. Then, any long-term item scheduled in a period starting in May 1995 and stored with a flag is searched for in the long-term data section 112 and displayed in the memo areas of the corresponding dates as is indicated by 13a of FIG. 13.

The CPU 4 resets the flag in the flag section 115 of the RAM 11 to indicate that the long-term item is displayed for the period for which a bar is also displayed. This means that, in the case where the period for the long-term item includes the date for the short-term item, the long-term item is displayed. Then, the CPU 4 waits for a prescribed period of time.

Next, the CPU 4 switches the long-term item to the graphic symbol.

For example, any long-term item scheduled in a period starting in May 1995 and stored with a flag is searched for in the long-term data section 112. Such a long-term item is deleted from the calendar, referring to the long-term data. Then, any short-term item scheduled in May 1995 and stored with a flag is searched for in the short-term data section 113 and the graphic symbol indicating such a short-term item is displayed in the memo area of the corresponding date, referring to the short-term data.

The CPU 4 displays the long-term item and the short-term item alternately until a predetermined signal is input thereto.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electronic device, comprising:

short-term data storing means for storing short-term data which represents a short-term scheduled event and includes graphic symbol data representing a graphic symbol and also for storing a first flag having one of a first state and a second state, the first flag corresponding to the short-term data;

long-term item data storing means for storing long-term data which represents a long-term scheduled event and includes long-term item data representing a long-term item of the long-term scheduled event and also for storing a second flag having one of the first state and the second state, the second flag corresponding to the long-term data;

display means for displaying the graphic symbol and the long-term item;

flag storing means for storing a third flag having one of the first state and the second state; and control means for, when the third flag is in the first state, controlling the display means to display the graphic symbol of the short-term scheduled event represented by the short-term data which corresponds to the first flag in the first state and for, when the third flag is in the second state, controlling the display means to display the long-term item of the long-term scheduled event represented by the long-term data which corresponds to the second flag in the first state.

2. An electronic device according to claim 1, wherein, when the third flag is in the first state, the control means controls the display means to delete the long-term item of the long-term scheduled event represented by the long-term data which corresponds to the second flag in the first state, and when the third flag is in the second state, the control means controls the display means to display the graphic symbol of the short-term scheduled event represented by the short-term data which corresponds to the first flag in the first state.

3. An electronic device according to claim 1, wherein the short-term data further includes date data representing a date on which the short-term item ms scheduled, and the long-term data further includes period data representing a starting date and a terminating date of a period during which the long-term item is scheduled; and wherein, when the date represented by the date data is included in the period represented by the period data, the control means puts the first flag corresponding to the short-term data into the first state and puts the second flag corresponding to the long-term data into the first state.

4. An electronic device according to claim 1, further comprising input means for inputting the short-term data and the long-term data.

5. An electronic device according to claim 1, wherein the display means is a liquid crystal display device.

6. An electronic device according to claim 1, wherein the short-term data storing means is a RAM.

7. An electronic device according to claim 1, wherein the long-term data storing means is a RAM.

* * * * *